United States Patent [19]

Staisch

[11] Patent Number: 4,665,796
[45] Date of Patent: May 19, 1987

[54] FLUID FLOW CONTROL APPARATUS HAVING A THROTTLING ARRANGEMENT

[75] Inventor: Diether Staisch, Walsrode, Fed. Rep. of Germany

[73] Assignee: WABCO Westinghouse Fahrzeugbremsen GmbH, Hanover, Fed. Rep. of Germany

[21] Appl. No.: 646,616

[22] Filed: Aug. 31, 1984

[30] Foreign Application Priority Data

Sep. 2, 1983 [DE] Fed. Rep. of Germany ....... 3331738

[51] Int. Cl.⁴ .................. F01L 15/00; F15B 13/044
[52] U.S. Cl. ........................................ 91/178; 91/534;
251/129.07; 251/129.11; 251/266; 251/267;
180/139; 280/432
[58] Field of Search ............... 280/432, 403; 180/139;
251/129.07, 129.11, 266, 267; 91/171, 178, 528,
534; 137/599

[56] References Cited

U.S. PATENT DOCUMENTS

| Re. 31,125 | 1/1983 | Dwyer | 180/139 |
|---|---|---|---|
| 863,180 | 8/1907 | Howard | 251/129.11 |
| 2,374,593 | 4/1945 | Ernst et al. | 251/129.07 |
| 2,916,252 | 12/1959 | Hobbs et al. | 251/129.07 |
| 3,684,238 | 8/1972 | Michellone et al. | 251/129.07 |
| 4,176,687 | 12/1979 | Ensign | 137/625.65 |
| 4,483,512 | 11/1984 | Drapeau | 251/267 |
| 4,508,142 | 4/1985 | Eburn, Jr. et al. | 251/129.11 |
| 4,556,231 | 12/1985 | Schultz | 280/432 |

FOREIGN PATENT DOCUMENTS

| 699183 | 12/1964 | Canada | 180/139 |
|---|---|---|---|
| 2141519 | 2/1973 | Fed. Rep. of Germany | 251/129.11 |
| 3048186 | 12/1980 | Fed. Rep. of Germany | |
| 3210603 | 10/1982 | Fed. Rep. of Germany | |

OTHER PUBLICATIONS

K. Kasperbauer, "Stromventile", Krausskopf—Verlag, May 1972.

Primary Examiner—Willis R. Wolfe, Jr.
Attorney, Agent, or Firm—G. E. Hawranko

[57] ABSTRACT

A fluid flow control apparatus having an adjustable throttling arrangement for controlling the flow of fluid between working cylinders associated with sections of an articulated vehicle, has a housing which is essentially symmetric in shape. Two working connections are formed at symmetrically opposite ends of the housing and connect to the working cylinders. Two passageways, formed in the housing to connect the two working connections, are also symmetrically formed and are approximately equivalent in length. The first passageway uses a check valve arrangement to restrict fluid flow from the first working connection to the second working connection while the second passageway uses a similar check valve arrangement to restrict fluid flow in the opposite direction. The two passageways interconnect at a crossover duct which acts as a guide for the throttling arrangement. A slide member, having a throttle face formed on a circumferential surface, is movable in relation to a throttle surface formed on the housing such that, a restriction is introduced to the fluid flow in both the first and second passageways. A motor drive/transmission arrangement controls movement of the slide in response to bending parameters established for the articulated vehicle. A relief valve provided in the first passageway, bypasses the throttling arrangement should an excessive fluid pressure occur.

17 Claims, 4 Drawing Figures

FLUID FLOW CONTROL APPARATUS HAVING A THROTTLING ARRANGEMENT

BACKGROUND OF THE INVENTION

This invention relates to a fluid flow control apparatus having a throttle arrangement, such flow control apparatus especially having the utility for controlling the bending angle of an articulated transit vehicle. It is a typical practice in such articulated vehicle applications to limit the bending angle by throttling the fluid flow between a hydraulic working cylinder and a hydraulic reservoir as a function of the size and rate of change of the bending angle. One typical method of controlling such fluid flow has been to modify the flow cross-section for the fluid between a valve seat and a control element designed as a sealing element. By modifying the axial displacement of the sealing element against the force of a retaining spring, the flow cross-section can be modified. This cross-section modification is controlled as a function of the above-mentioned characteristics of the bending angle whereby the measurement of these characteristics and the control of the modification of the cross-section is done by means of a mechanical transmission apparatus having numerous levers, push rods, guides, springs and articulations. The complexity of such a configuration has, as a byproduct, the inherent disadvantage of high machining, manufacturing and maintenance costs. Additionally, the linkage and transmission arrangement previously described has the further disadvantage of being an indirect transfer of work which results in work inefficiencies. A further disadvantage known to the previously described arrangement is that of size and placement, such a structure requires large amounts of mounting space and also requires placement in close proximity to the working cylinders which control the vehicle's articulation.

SUMMARY OF THE INVENTION

It is, therefore, an object of the invention to provide a fluid flow control apparatus having a throttle arrangement which can be constructed and maintained at an economical cost level.

It is yet another object of the invention to provide such a fluid flow control apparatus which offers the advantage that the activation of the control element is direct, thereby eliminating an expensive lever and rod transmission.

It is an even further object of the invention to provide such a fluid flow control apparatus which can be constructed of a relatively compact package thereby facilitating mounting of such control apparatus.

Still another object of the invention is to provide such a fluid flow control apparatus which can be mounted in a position relatively remote to the working cylinders which control the vehicle's articulation.

An even further object of the invention is to provide a fluid flow control apparatus which can be applied outside the field of articulated vehicles as well, that is, the flow control apparatus can be used as a throttle for other types of valve units.

Briefly, the invention includes a housing essentially symmetric in shape whereby a first flow passageway allows fluid flow toward a first working connection and a second flow passageway allows fluid flow toward a second working connection, which working connections can be connected to the right-hand and left-hand working cylinders for the articulated vehicle, respectively. A slide member, controlled by a motor/drive arrangement controls the flow of fluid through an adjustable throttle which both first and second fluid passageways are in communication with. After passing through the adjustable throttle, the first and second passageways meet at a crossover duct at which point a connection to a fluid reservoir branches off. Located adjacent the crossover duct is a relief valve arrangement which allows bypassing the adjustable throttle arrangement for one of the passageways. Two check valves are arranged in each of the first and second flow passageways to direct the fluid flow in the proper directions.

DESCRIPTION AND OPERATION

Figure 1:
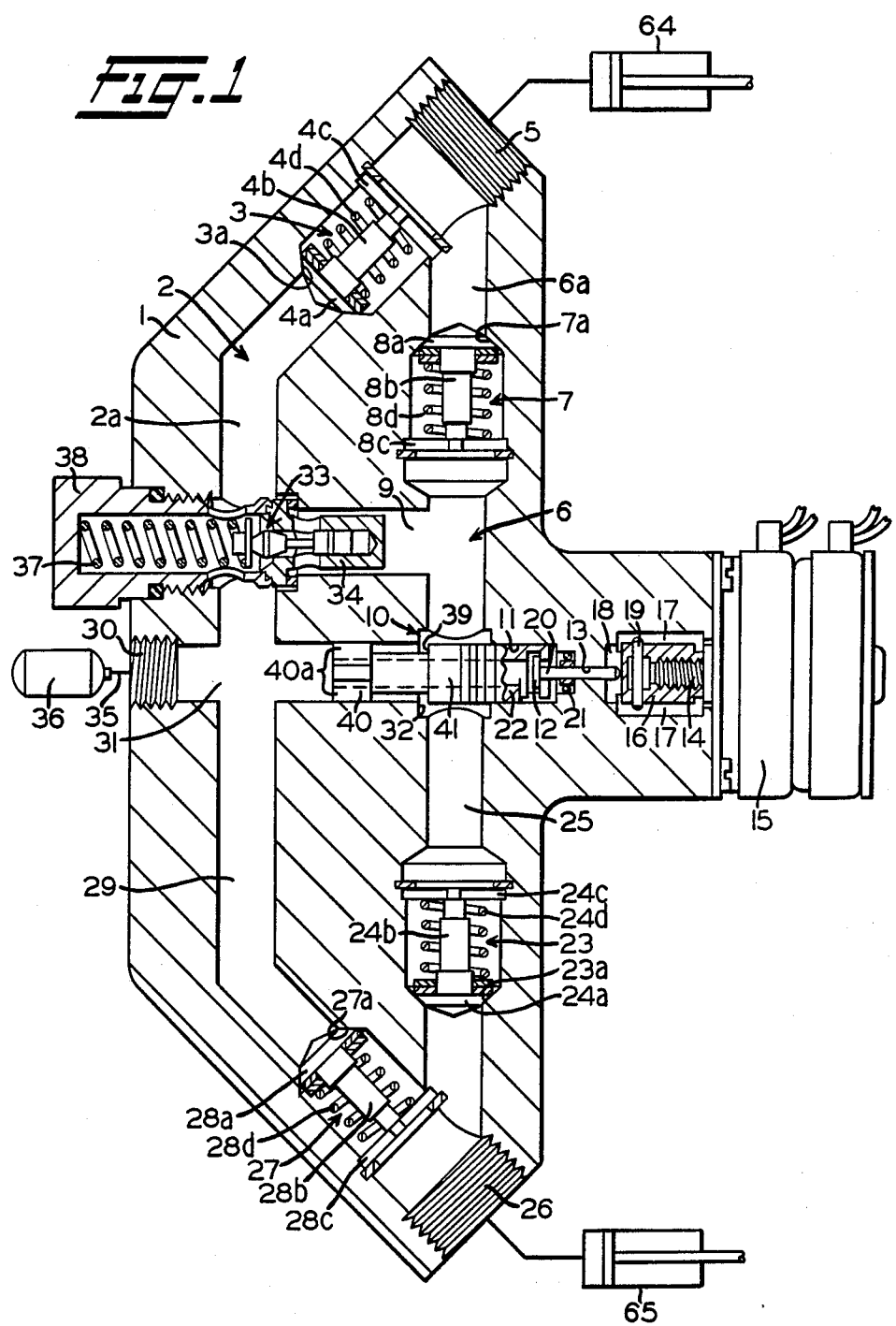
FIG. 1 is an elevational view in partial section of a fluid flow control apparatus having a throttle arrangement embodying the invention.

As seen in FIG. 1, the fluid flow control apparatus having a throttle arrangement includes a housing 1 essentially symmetrical in shape about the longitudinal axis. Formed at symmetrically opposite ends about the longitudinal axis of the housing 1 are a first and a second working connection 5, 26 which can be connected for fluid communication to the working cylinders 64,65 located between portions of the articulated vehicle. Formed along the longidunal axis of the housing 1 is a reservoir connection 30 which opens to a branch duct 35 extending to an externally connected reservoir 36. The reservoir connection 30 is in fluid communication with a crossover duct 31 also formed on the longitudinal axis of the housing 1 and which serves as a crossing point between a first and a second passageway arrangement 6, 2, respectively. The first and second passageway arrangements 6, 2 each consist of several branches and are each connected between the first and second working connections 5, 26, respectively. The first passageway arrangement 6 contains a first branch section 6a which extends from the first working connection 5 at substantially a right angle relative to the longitudinal axis of the housing 1. This first branch section 6a extends to the longitudinal axis at which point an adjustable throttle arrangement, shown generally at 10, is disposed and which will be described hereinafter in further detail. The portion of the first passageway arrangement 6 which continues from the throttle arrangement 10 is the crossover duct 31 previously described. From the crossover duct 31, the first passageway arrangement 6 continues via second branch section 29. The second branch section 29 is in fluid communication with the second working connection 26. Disposed within the first branch section 6a is a first check valve 7, 8 arranged such that fluid can flow only from the first working connection 5 to the second working connection 26. Disposed within the second branch section 29 of the first passageway arrangement 6 is a second check valve 27, 28 arranged such that, fluid flows in the same direction as previously described, that is, from the first working connection 5 to the second working connection 26. As seen in FIG. 1, the second branch section 29 extends toward the second working connection 26 at an angle approximately 45° relative to the longitudinal axis.

The second passageway arrangement 2 contains a third branch section 25 which extends from the second working connection 26 at substantially a right angle relative to the longitudinal axis of the housing 1. This third branch section 25 extends to the longitudinal axis at which point such third branch section 25 communicates with the adjustable throttle 10 at the side of the adjustable throttle 10 opposite communication with the first branch section 6a. As in the case of the first passageway arrangement 6, the portion of the second passageway arrangement 2 exiting the adjustable throttle 10 is the crossover duct 31. Extending from the crossover duct 31, the second passageway arrangement 2 has a fourth branch section 2a which is in fluid communication with the first working connection 5. The second passageway arrangement 2 also contains a third and fourth check valve 23, 24 and 3, 4, respectively; such third and fourth check valves 23, 24 and 3, 4 being disposed in the third and fourth branch sections 25 and 2a, respectively. The fourth branch section 2a, similar to the second branch section 29, approaches the first working connection 5 at approximately a 45° angle relative to the longitudinal axis. The third and fourth check valves 23, 24 and 3, 4 are disposed in the second passageway arrangement 2 such that fluid flows in a direction from the second working connection 26 to the first connection 5 only.

The above-mentioned check valves are designed as conical valves, each having a beveled seat 3a, 7a, 23a and 27a in the duct and each having a conical valve closing element 4a, 8a, 24a and 28a which is guided by means of a tappet 4b, 8b, 24b and 28b against a permeable base plate 4c, 8c, 24c and 28c. The permeable base plate 4c, 8c, 24c and 28c is pushed by a positioning spring 4d, 8d, 24d and 27d against the respective base plates, whereby the base plates are supported in the housing 1.

As the result of the arrangement of the check valves described above, the fluid current in the direction from the first working connection 5 to the second working connection 26 can only take the path of the first passageway arrangement 6 and in the opposite direction, only the path through the second passageway arrangement 2.

Between the first check valve 7, 8 and the throttle 10, and branching off from the first passageway arrangement 6, there is a relief branch 9 to a pressure relief valve 33, 34. The pressure relief valve 33, 34 when open, releases the fluid flow in the direction previously described for the first passageway arrangement 6, thereby bypassing the throttle 10. In this manner, the relief branch 9 assumes the function of the crossover duct 31 and feeds fluid in multiple directions. The pressure relief valve 33, 34 has a valve body 33 which bears against a valve spring 37 having a tension value preset such that a predetermined flow of force causes the valve body 33 to compress the valve spring 37 thereby opening the pressure relief valve 33, 34. An adjustment cap 38 threadably engages the housing 1 at a point adjacent the relief valve 33, 34 such that, turning the adjustment cap 38 adjusts the tension value of the valve spring 37 and thereby adjusts the operating pressure of the relief valve 33, 34.

Equiaxial to the crossover duct 31 within the housing 1, is a graduated bore having a first guide portion 11, a transmission portion 18, and a tappet guide portion 13 separating the first guide portion 11 and the transmission portion 18. The tappet guide portion 13 is of substantially reduced diameter relative to the first guide and transmission portions 11 and 18. A slide gate 22 slidably fits within at least a portion of the first guide portion 11 and is movable between this first guide portion 11 and a portion of the crossover duct 31 in which the slide gate 22 also slidably fits. The slide gate 22 is constructed such that, a circumferential radial surface 39 facing the crossover duct 31, together with a throttle opening 32, forms the adjustable throttle 10. Extending within the crossover duct 31 is a grooved extension portion 40 of the slide gate 22, the grooved extension 40 being formed adjacent the radial surface 39. The grooved extension 40 has radial extensions 40a which contact the inner wall of the crossover duct 31 at least three points thereby leaving the lowered areas between the radial extensions 40a as open areas to allow the flow of fluid therethrough to the crossover duct 31.

A longitudinal bore 41 runs through the length of the slide gate 22 thereby facilitating the sliding movement of the slide gate 22 even in the presence of pressure differences at the ends of the slide gate 22.

A tappet member 20 extends through the tappet guide portion 13 of the graduated bore to the first guide portion 11. The tappet member 20 is connected to the slide member 22 within the first guide portion 11. A sealing element 21 is disposed within the first guide portion 11 at the entry point of the tappet member 20 thereby preventing fluid communication between the first guide portion 11 and the transmission portion 18.

The tappet member 20 has on its end facing the slide member 22 a disk-shaped catch 12, by means of which it is held firmly in the end of the slide member 22 as it is guided in the first guide section 11. To receive the disk-shaped catch 12, there is a radial slit in the slide gate 22 corresponding to the diameter and the thickness of the disk-shaped catch 12. The slide gate also has a radial groove with approximately the same diameter as the tappet member 20, which allows a radial mating of the slide 22 and the tappet 20. In this manner, it can be appreciated the slide member 22 and the tappet member 20 are linked together in an articulated manner, to allow articulation between the slide member 22 and the tappet member 20.

The tappet member 20 contacts, on the end opposite the connection to the slide member 22, a drive nut 16 which is part of a transmission arrangement disposed within the transmission portion 18 of the graduated bore. The transmission portion 18 is provided with two longitudinal grooves 17 formed radially opposite one another. A guide pin 19 extends between the longitudinal grooves 17 through the drive nut 16. By extending the guide pin 19 through the drive nut 16 and into the longitudinal groove 17, it can be appreciated that the drive nut 16 can move only in the axial direction.

An electric motor 15 is mounted on the housing 1 at a point adjacent the transmission portion 18 of the graduated bore. The electric motor 15 has a shaft 14 extending into the transmission portion 18. The drive nut 16 threadably engages the shaft 14 such that, as the electric motor operates and the shaft 14 rotates, the threaded connection causes the drive nut 16 to unthread therefore moving the drive nut 16 in an axial direction. The electric motor 15 can be controlled by an electronic control apparatus (not shown) which can control the rotational speed of the shaft according to the operating parameters of the articulated vehicle. This preselected rotational speed of the electric motor is translated via the drive nut 16 into an axial movement of the drive nut 16 and the tappet member 20. The axial movement of the tappet member 20 is then transmitted to the slide member 22 thereby positioning the slide member 22 within the throttle opening 32 to allow a predetermined amount of fluid flow through the adjustable throttle 10.

In operation, the fluid flow control apparatus having a throttling arrangement operates under a controlled system fluid level whereby the operating fluid is fully contained within the system and is maintained by the pressure reservoir 35. The working cylinders 64, 65 are arranged between the sections of the articulated vehicle such that, when the vehicle sections rotate relative to one another as occurs when the vehicle is steered around a curve thus causing the working cylinders 64, 65, which are disposed on opposite sides of the pivot point, to operate in opposing relation to one another, a fluid volume is displaced between the working cylinders 64, 65 through the fluid flow control apparatus and reservoir 35.

A fluid current is thereby established in the first or second passageway arrangement 2, 6 as a function of the direction of the bending movement, which as a result of the check valve arrangement previously detailed, limits the fluid current flow to one passageway arrangement at a time. If the bending operation is such that, current is flowing into the first working connection 5 from the first working cylinder 64, the first passageway arrangement 6 consisting of the first passage section 6a, the opened first check valve 7, 8 the throttle opening 32, the crossover duct 31, and the second passage section 29 will be utilized and the fluid current will flow out of the second working connection 26.

The electronic control apparatus (not shown) can be located either adjacent or remote to the fluid flow control apparatus, the placement of such device being determined according to the architecture of the articulated vehicle. This electronic control apparatus can measure vehicle parameters, for example, the angle of the steering lock, the bending angle, and the rate of change of the bending angle. The electronic control device can then transmit a corresponding control pulse to the electric motor 15. The control pulse or pulses determine the operation of the electric motor 15 such that, the driveshaft 14 executes a precise rotational movement, the magnitude of which is determined by the number of control pulses. By means of an external thread on the driveshaft 14 and the drive nut 16 having an internal thread, the rotational movement of the driveshaft 14 is transmitted to the drive nut 16. Since the drive nut 16 is held in a nonrotating manner by way of the guide pin 19 extending through the drive nut 16 and into the longitudinal grooves 17, this precisely graduated rotational movement is converted into a precisely graduated axial movement.

If it is desired to increase the throttling effect of the adjustable throttle 10, the electronic control apparatus controls the electric motor 15 such that, the drive nut 16, via the tappet member 20, displaces the slide member 22 so that the radial surface 39 and throttle opening 32 are brought closer together thereby reducing the throttle crosssection. The fluid current is completely interrupted and the articulation movement limited, if the radial surface 39 and throttle opening 32 have come together to the point where there is a zero distance between them. To guarantee this limit position, the radial surface 39 of the slide member 22 can slightly overrun the throttle opening 32 of the crossover duct 31.

If it is desired to reduce the throttling action of the fluid flow control apparatus, the electronic control apparatus outputs a control impulse to the electric motor 15 which results in the drive nut 16 being moved away from the slide member 22 and the tappet member 20. Since in FIG. 1, there is no physical connection between the tappet member 20 and the drive nut 16, the slide member 22 and tappet member 20 are moved back under the force of the system pressure until the tappet member 20 contacts the drive nut 16 in the position determined by the control pulses transmitted to the electric motor 15. In this manner, it can be appreciated the slide member 22 and the tappet member 20 arrangement does not impede movement of the drive nut 16 and driveshaft 14 arrangement. Further, to reduce any detrimental force and thus axial load on the electric motor 15, the slide member 22 has formed therein a longitudinal bore 41 which provides a pressure balance across the surfaces of the slide member 22. The sealing element 21 further insures that the system pressure is prevented from affecting the electric motor 15 which thereby makes it possible to use a low power and more economical motor.

If the pressure difference which builds up at the adjustable throttle 10 exceeds a value determined by a presetting of the pressure relief valve 33, 34, the pressure relief valve 33, 34 will open and the branch duct 9 leading to the pressure relief valve 33, 34 will open as well. In this manner, the excessive fluid pressure will bypass the adjustable throttle 10. Overloading of components of the valve unit and the working cylinders, including the connecting lines as a result of a sudden articulation movement is thereby prevented. As the result of the integration of the pressure relief valve 33, 34 and to the fluid flow control apparatus, the overload protection is particularly effective and economical.

Figure 2:
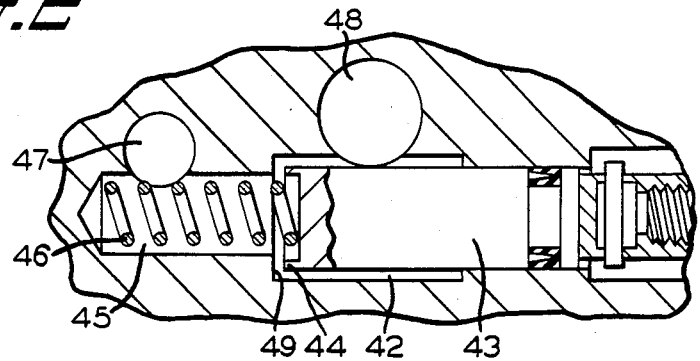
FIG. 2 is an elevational view, in section, of an alternate embodiment of the slide member, drive arrangement shown in FIG. 1.

As seen in FIG. 2, the fluid flow control apparatus can be provided with an adjustable throttle portion which allows operation utilizing an open fluid system arrangement. In this configuration, it can be appreciated that the construction of the slide gate and transmission arrangement is greatly simplified. A discussion concerning the configuration of the check valves and passageway arrangements will not be repeated inasmuch as the fluid flow control apparatus utilizing the throttle arrangement of FIG. 2 consists of the same of such elements. In this example, the slide gate 43 moves axially within the crossover duct 45 which consists of the graduated opening 45, 42. A throttle surface 49 is formed within the graduated opening 45, 42 at the transition between the duct portion 45 and duct portion 42. A throttle face 44 constructed in the form of a lip around one end of the slide member 43 contacts the throttle surface 49 thus forming the adjustable throttle. The throttle spring 46 disposed within the duct portion 45 contacts the slide member 43 such that, return movement of the slide member 43 can be effected in the absence of a system fluid pressure. It can be appreciated that the slide member 43 will be of a simpler construction since a balancing of the system pressures to effect a smooth return movement of the slide member 43 is no longer required. It can also be appreciated that the tappet member is not needed in the connection between the drive nut 16 and the slide member 43. FIG. 2 also shows duct openings 47 and 48 which are parts of the respective first and second passageways in communication with the crossover duct 45, 42.

Figure 3:
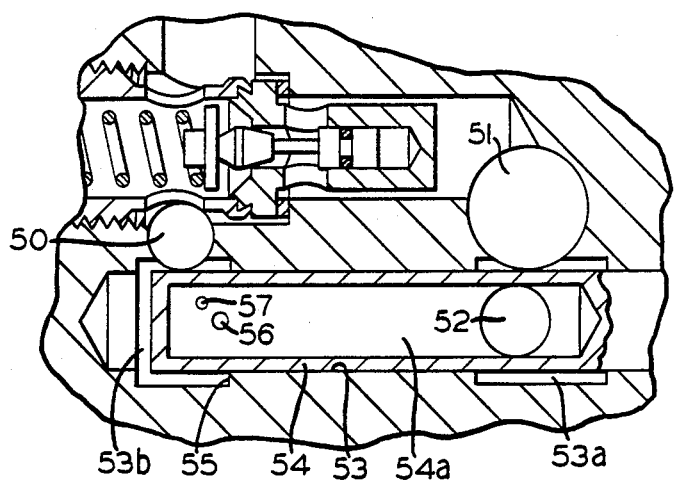
FIG. 3 is an elevational view, in section, of an alternate embodiment of the slide member, relief valve arrangement shown in FIG. 1.

FIG. 3 shows a fluid flow control apparatus having an adjustable throttle arrangement formed primarily using the slide gate member 54. In this example, the crossover duct 53 serves the dual purpose of being a guide for the slide gate 54. The crossover duct 53 has a first duct portion 53a and a second duct portion 53b. The slide gate member 54 has a central cavity 54a formed therein. On one end of the central cavity 54a, a first cavity opening 52 is provided. At the end of the central cavity 54a, opposite the first cavity opening 52, throttle openings 56 and 57 are provided. At the widening of the second duct portion 53b, there is an annular control edge 55 which forms a portion of the adjustable throttle in conjunction with the throttle openings 56, 57. In this example, duct openings 50 and 51 provide communication for the first and second passageways to the crossover duct 53 and the adjustable throttle 55. Fluid flowing through the duct opening 51, for example, travels through the first cavity opening 52, through the central cavity 54a, and depending upon the position of the slide member 54, through the throttle openings 56 or 57 and into the crossover duct portion 53b. It can be appreciated that the adjustable throttle 55 can also be executed at the first cavity opening 52 of the slide member 54, with the throttle surface being formed at the crossover duct portion 53a.

Figure 4:
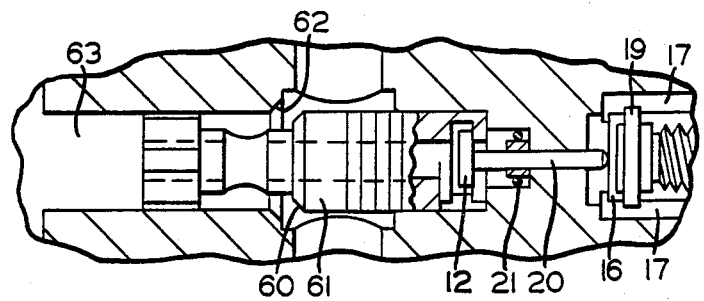
FIG. 4 is an elevational view, in section, of an alternate embodiment of the slide member arrangement shown in FIG. 1.

FIG. 4 shows a configuration of a fluid flow control apparatus having an adjustable throttle wherein the adjustable throttle is constructed as a needle valve arrangement. The sealing surface on the housing side is formed by a circumferential inclined surface 62 located on a cross-sectional windening of the crossover duct 63, and the sealing surface on the side of the slide gate member 61 is formed by an inclined surface on the slide gate member 61. The slide inclined surface 60 formed on the slide gate member 61 is formed complementarily to the inclined surface 62 formed on the housing side.

With the principal embodiment of the invention now having been fully detailed, it should be appreciated that alternate embodiments are possible as well. As an example, the axis of rotation of the electric motor can also be oriented at an angle relative to the axis of displacement of the slide gate, whereby the axial displacement of the slide gate is carried out by means of a rack and pinion gear.

As a further example, it is also possible to integrate a magnetically controlled safety valve into fluid flow control apparatus described above and to suitably connect the safety valve with the passageways so that in the event of a failure of the electrical supply to the electronic control apparatus and/or the electric motor, there is a bypassing of the adjustable throttle and thus an emergency operation is possible for the articulated vehicle.

A further example would be to provide a single two-way valve in place of the two check valve arrangements used in the first and second passageways shown in FIG. 1. This example would require further modification to the placement of the relief valve and crossover ducts as well.

Although the hereinabove described forms of embodiments of the invention and the noted alternate embodiments constitute preferred forms, it can be appreciated that other modifications may be made thereto without departing from the scope of the invention as set forth in the appended claims.

Having now described the invention, what I claim as new and desire to secure by Letters Patent, is:

1. A fluid flow control apparatus having an adjustable throttling arrangement which controls the flow of fluid between a first and a second working cylinder, said fluid flow control apparatus comprising:
   (a) a housing having at least a first and a second passageway formed therein;
   (b) first and second working connections in fluid communication with first and second work chambers formed in the first and second working cylinders, respectively;
   (c) a first passageway formed in said housing between said first and second working connections, said first passageway having at least one check valve disposed therein such that fluid flows in one direction only within said first passageway;
   (d) a second passageway formed in said housing between said first and second working connections, a portion of said second passageway intersecting a portion of said first passageway such that a crossover duct is formed at such point of intersection, said second passageway further having at least one check valve disposed therein such that, such fluid flows only in a second direction opposite such one direction within said second passageway;
   (e) adjustable throttling means disposed partially within said crossover duct and having a movable slide portion for restricting such fluid flow in said first and second passageway an amount in response to a mutually opposing operation in the first and second working cylinders in which one of said first and second work chambers is pressurized while the other of said first and second passageways is evacuated, and vice-versa; and
   (f) driving means connected to said adjustable throttling means for imparting an axially directed force on said movable slide portion upon receiving at least one throttling signal which is generated in response to a predetermined change in such mutually opposing operation of the first and second working cylinders.

2. A fluid flow control apparatus, as set forth in claim 1, wherein said adjustable throttle means and said driving means are coaxially disposed adjacent one another on the longitudinal axis of said housing.

3. A fluid flow control apparatus, as set forth in claim 1, wherein said first and said second passageways are formed in an inversely symmetric relation within said housing.

4. A fluid flow control apparatus as set forth in claim 1, wherein said drive means includes a motor having a driveshaft rotatable upon receiving such throttle signal, said drive means further having a drive nut threadably engaging said driveshaft, a guide pin extending through said drive nut into two pin grooves formed longitudinally opposite one another in said housing such that, rotational movement of said drive nut is prevented and whereby rotational movement of said driveshaft causes axial movement of said drive nut, and a tappet member engaging said drive nut and extending toward said slide member such that, axial movement of said drive nut imparts an equivalent axial movement to said slide member.

5. A fluid flow control apparatus, as set forth in claim 4, wherein said tappet member has a disk portion secured at the end connected to said slide member and said slide member has a disk pocket in which said disk portion of said tappet member fits such that, such axial movement of said drive nut can be imparted to said slide member in a linear and a substantially nonlinear manner.

6. A fluid flow control apparatus, as set forth in claim 1, wherein said crossover duct is disposed approximately midway within each of said first and second passageways.

7. A fluid flow control apparatus, as set forth in claim 6, wherein said crossover duct is formed on the longitudinal axis of said housing.

8. A fluid flow control apparatus, as set forth in claim 1, further including a pressure relief means in fluid communication with said first passageway for bypassing said adjustable throttling means when such flow of fluid results in a pressure force in excess of a predetermined value.

9. A fluid flow control apparatus, as set forth in claim 8, wherein said relief means includes a relief passage extending from said first passageway, a valve body disposed partially in said relief passage, a valve seat formed in said housing, and a valve spring acting on said valve body such that, said valve body is urged against said valve seat until such fluid flow results in a pressure force in excess of a predetermined value which unseats said valve body from said valve seat and opens said first passageway.

10. A fluid flow control apparatus, as set forth in claim 9, whereby said relief valve means further includes an adjustable cap threadably engaging said housing and having a spring seat in which said valve spring is seated, said adjustable cap being rotatable such that, said valve spring is adjusted in tension strength thereby altering the predetermined value of pressure force at which said valve body unseats from said valve seat.

11. A fluid flow control apparatus, as set forth in claim 1, further including a fluid reservoir connected to said housing and in fluid communication with said first and second passageways via said crossover duct.

12. A fluid flow control apparatus, as set forth in claim 11, wherein said slide member has a longitudinal bore formed therein such that, balancing of pressures across respective ends of said slide member is achieved thereby facilitating axial movement of said slide member.

13. A fluid flow control apparatus, as set forth in claim 12, further including a sealing element disposed adjacent said slide member such that, fluid pressure acting on said slide member is prevented from acting on said drive means.

14. A fluid flow control apparatus, as set forth in claim 1, wherein said adjustable throttling means includes a throttle surface formed on a portion of said crossover duct and a throttle face formed on a portion of said slide membe and positionable relative to said throttle surface such that, fluid flow across said throttle surface and throttle face can be adjusted according to movement of said slide member.

15. A fluid flow control apparatus, as set forth in claim 14, wherein said drive means includes a motor having a driveshaft rotatable upon receiving such throttle signal, said drive means further having a drive nut threadably engaging said driveshaft, a guide pin extending through said drive nut into two pin grooves formed longitudinally opposite one another in said housing such that, rotational movement of said drive nut is prevented and whereby rotational movement of said driveshaft causes axial movement of said drive nut, and a tappet member engaging said drive nut and extending toward said slide member such that, axial movement of said drive nut imparts an equivalent axial movement to said slide member.

16. A fluid flow control apparatus, as set forth in claim 14, wherein said slide member has an annular grooved portion formed on an end opposite the connection to said drive means, said annular grooved portion fitting partially within said crossover duct in a guided manner.

17. A fluid flow control apparatus, as set forth in claim 16, wherein said annular grooved portion of said slide member has at least three radial projections which contact said crossover duct and wherein said annular grooved portion has at least two grooved lower portions through which fluid can flow following passage through said throttle surface and throttle face arrangement.

* * * * *